(12) United States Patent
Park

(10) Patent No.: US 7,760,613 B2
(45) Date of Patent: Jul. 20, 2010

(54) RECORDING MEDIUM WITH PHYSICAL ACCESS CONTROL (PAC) CLUSTER THEREON AND APPARATUS AND METHODS FOR FORMING, RECORDING, AND REPRODUCING THE RECORDING MEDIUM

(75) Inventor: Yong Cheol Park, Gwachon-si (KR)

(73) Assignee: LG Electronics, Inc., Seoul (KR)

( * ) Notice: Subject to any disclaimer, the term of this patent is extended or adjusted under 35 U.S.C. 154(b) by 1185 days.

(21) Appl. No.: 11/061,666

(22) Filed: Feb. 22, 2005

(65) Prior Publication Data

US 2005/0207319 A1 Sep. 22, 2005

Related U.S. Application Data

(60) Provisional application No. 60/554,356, filed on Mar. 19, 2004, provisional application No. 60/566,090, filed on Apr. 29, 2004, provisional application No. 60/577,181, filed on Jun. 7, 2004.

(30) Foreign Application Priority Data

May 31, 2004 (KR) ...................... 10-2004-0039142

(51) Int. Cl.
G11B 7/24 (2006.01)
(52) U.S. Cl. .................................................. 369/275.1
(58) Field of Classification Search .............. 369/47.14, 369/53.16, 59.25, 124.07
See application file for complete search history.

(56) References Cited

U.S. PATENT DOCUMENTS

| | | | |
|---|---|---|---|
| 5,237,553 A | | 8/1993 | Fukushima et al. |
| 5,315,447 A | * | 5/1994 | Nakayama et al. ............ 360/49 |
| 5,552,776 A | | 9/1996 | Wade et al. |
| 5,815,485 A | | 9/1998 | Tanaka et al. |
| 6,115,346 A | | 9/2000 | Sims, III |
| 6,223,303 B1 | | 4/2001 | Billings et al. |
| 6,330,210 B1 | | 12/2001 | Weirauch et al. |
| 6,351,788 B1 | | 2/2002 | Yamazaki et al. |
| 6,526,522 B1 | | 2/2003 | Park et al. |
| 6,580,684 B2 | * | 6/2003 | Miyake et al. ............ 369/275.3 |
| 6,621,783 B1 | | 9/2003 | Murata |
| 6,691,209 B1 | | 2/2004 | O'Connell |

(Continued)

FOREIGN PATENT DOCUMENTS

CN 1192818 9/1998

(Continued)

OTHER PUBLICATIONS

PCT International Search Report dated Sep. 13, 2005 for International Application No. PCT/KR 2005/000592.

(Continued)

Primary Examiner—Joseph H Feild
Assistant Examiner—Henok G Heyi
(74) Attorney, Agent, or Firm—Harness, Dickey & Pierce, P.L.C.

(57) ABSTRACT

A recording medium, such as a high-density and/or optical recording medium including at least one physical access control (PAC) cluster recorded thereon, and apparatus and methods for recording to and reproducing from the recording medium, in order to improve data protection, data management and/or reproduction compatibility.

29 Claims, 20 Drawing Sheets

U.S. PATENT DOCUMENTS

| | | |
|---|---|---|
| 6,725,200 B1 | 4/2004 | Rost |
| 6,785,839 B2 | 8/2004 | Ko et al. |
| 6,912,188 B2 | 6/2005 | Morishima |
| 6,963,523 B1 | 11/2005 | Park |
| 7,133,333 B2 | 11/2006 | Ko |
| 7,230,893 B2 | 6/2007 | Park |
| 2002/0036643 A1 | 3/2002 | Namizuka et al. |
| 2002/0078295 A1 | 6/2002 | Shaath et al. |
| 2002/0136118 A1 | 9/2002 | Takahashi |
| 2003/0048731 A1 | 3/2003 | Ozaki |
| 2003/0137910 A1 | 7/2003 | Ueda et al. |
| 2003/0137915 A1 | 7/2003 | Shoji et al. |
| 2003/0210627 A1 | 11/2003 | Pope et al. |
| 2003/0212564 A1* | 11/2003 | Sawabe et al. .............. 704/500 |
| 2004/0013061 A1 | 1/2004 | Wu |
| 2004/0174793 A1* | 9/2004 | Park et al. ................. 369/59.25 |
| 2004/0193946 A1* | 9/2004 | Park et al. ...................... 714/6 |
| 2004/0218488 A1 | 11/2004 | Hwang et al. |
| 2004/0228238 A1 | 11/2004 | Ko et al. |
| 2004/0246852 A1 | 12/2004 | Hwang et al. |
| 2005/0083740 A1 | 4/2005 | Kobayashi |
| 2005/0111315 A1* | 5/2005 | Hwang et al. ............ 369/47.14 |
| 2005/0169132 A1 | 8/2005 | Kuraoka et al. |
| 2005/0195716 A1* | 9/2005 | Ko et al. .................. 369/53.16 |
| 2005/0207318 A1 | 9/2005 | Park |
| 2006/0184727 A1 | 8/2006 | Sasaki et al. |
| 2006/0221689 A1 | 10/2006 | Yoshida et al. |
| 2007/0053267 A1 | 3/2007 | Brondijk |

FOREIGN PATENT DOCUMENTS

| | | |
|---|---|---|
| EP | 0 495 471 A2 | 7/1992 |
| EP | 0997904 | 8/1999 |
| EP | 1 061 517 A1 | 12/2000 |
| EP | 1 251 508 A2 | 10/2002 |
| EP | 1 329 888 A1 | 7/2003 |
| EP | 1 381 047 A1 | 1/2004 |
| EP | 1505597 | 2/2005 |
| EP | 1587102 | 10/2005 |
| JP | 06-259886 | 9/1994 |
| JP | 07-121993 | 5/1995 |
| JP | 09-213011 | 8/1997 |
| JP | 11-039801 | 2/1999 |
| JP | 2000-322835 | 11/2000 |
| JP | 2002-124037 | 4/2002 |
| JP | 2002-278821 | 9/2002 |
| JP | 2002-328848 | 11/2002 |
| JP | 2003-242650 | 8/2003 |
| JP | 2003-323769 | 11/2003 |
| JP | 2003-346426 | 12/2003 |
| JP | 2004-030779 | 1/2004 |
| RU | 2225043 | 2/2004 |
| RU | 2269829 | 2/2006 |
| WO | WO 00/45386 | 8/2000 |
| WO | WO 01/01416 A1 | 1/2001 |
| WO | WO 01/18731 A1 | 3/2001 |
| WO | WO 02/52556 | 4/2002 |
| WO | WO 02/067093 | 8/2002 |
| WO | 03/030173 | 4/2003 |
| WO | WO 03/102936 A1 | 12/2003 |
| WO | WO 03/105150 | 12/2003 |
| WO | WO 2004/001753 A1 | 12/2003 |
| WO | WO 2004/001754 A1 | 12/2003 |
| WO | WO 2004/019326 A1 | 3/2004 |
| WO | WO 2004/025649 | 3/2004 |
| WO | WO 2004/036561 | 4/2004 |
| WO | WO 2004/079730 A1 | 9/2004 |
| WO | WO 2004/081936 A1 | 9/2004 |
| WO | 2005/086598 | 9/2005 |
| WO | WO 2005/088636 A1 | 9/2005 |

OTHER PUBLICATIONS

U.S. Patent Office Action dated May 13, 2008, for U.S. Appl. No. 11/061,665.
European Patent Office Action dated May 14, 2008, for European Patent Application No. 04808643.3-2223.
European Patent Office Search Report dated May 15, 2008, for European Patent Application No. 07111355.9-2223.
Search report issued Aug. 4, 2008 by the European Patent Office in counterpart European Patent Application No. 07110264.4-2223.
Search report issued Jul. 30, 2008 by the European Patent Office in counterpart European Patent Application No. 07150328.8-2223.
Office Action issued Sep. 12, 2008 by the USPTO in counterpart U.S. Appl. No. 11/155,485.
Office Action issued Sep. 3, 2008 by the USPTO in counterpart U.S. Appl. No. 11/085,134.
Office Action issued Dec. 12, 2008 by the U.S. Patent and Trademark Office in counterpart U.S. Appl. No. 11/907,660.
Office Action issued Jan. 15, 2009 by the Russian Patent Office in counterpart Russian Patent Application No. 2006136909 (with English language translation).
English language translation of Office Action issued Mar. 30, 2009 by the Russian Patent Office in counterpart Russian Patent Application No. 2006136920/28.
Office Action issued May 22, 2009 by the Malaysian Patent Office in counterpart Malaysian Patent Application No. PI 20045424.
Office Action issued Jun. 11, 2009 by the USPTO in related U.S. Appl. No. 11/061,891.
Office Action issued Jun. 9, 2009 by the USPTO in related U.S. Appl. No. 11/907,660.
Office Action issued Jun. 23, 2009 by the Australian Patent Office in counterpart Australian Patent Application No. 2004317315.
Notice of Allowance for Russian patent application No. 2006136909/28 dated Aug. 20, 2009.
Japanese Office Action dated Oct. 16, 2009 with English translation for counterpart Japanese Patent Application No. 2007-238481.
Japanese Office Action dated Oct. 16, 2009 with English translation for counterpart Japanese Patent Application No. 2007-503819.
Blu-Ray Disc Association, "Rewritable Blu-Ray Disc (BD-RE) Multi-Media Command Set Description, Version 0.80", [Online] Nov. 9, 2004.
Search Report issued May 23, 2008 by the European Patent Office in counterpart European Patent Application No. 07120363.2-2223.
Japanese Office Action dated Nov. 6, 2009 for corresponding Japanese Patent Application No. 2007-503814.
Chinese Office Action dated Oct. 23, 2009 for corresponding Chinese Application No. 200710138431.4.
Russian Notice of Allowance dated Oct. 25, 2009 for corresponding Russian Application No. 2006136920/28(040193).

* cited by examiner

| | | BD-R |
|---|---|---|
| INFO2 | Reserved | 128 |
| | PAC 2 | 32 |
| | DMA2 | 32 |
| | CD2 | 32 |
| | BZ3 | 32 |
| INFO1 | BZ2 | 32 |
| | Drive Area | 128 |
| | Reserved | |
| | DMA1 | 32 |
| | CD1 | 32 |
| | PAC 1 | 32 |

FIG. 4

| Data Frame | Byte position in Data Frame | contents | number of bytes |
|---|---|---|---|
| 0 | 0 | PAC_ID | 3 |
| 0 | 3 | PAC format | 1 |
| 0 | 4 | PAC Update Count | 4 |
| 0 | 8 | Unknown PAC Rules | 4 |
| 0 | 12 | Entire_Disc_Flags | 1 |
| 0 | 13 | reserved and set to 00h | 2 |
| 0 | 15 | number of Segments | 1 |
| 0 | 16 | Segment_0 | 8 |
| 0 | 24 | Segment_1 | 8 |
| 0 | 32 | ⋮ | 29*8 |
| 0 | 264 | Segment_31 | 8 |
| 0 | 272 | reserved and set to 00h | 112 |
| 0 | 384 | PAC specific information | 1664 |
| 1 | 0 | PAC specific information | 2048 |
| ⋮ | ⋮ | ⋮ | ⋮ |
| 31 | 0 | PAC specific information | 2048 |

FIG. 5

| Area | | Bits | Control type |
|---|---|---|---|
| | | b31 to b24 | reserved |
| | ⋮ | ⋮ | ⋮ |
| INFO | TDMA Zones | b7 | write |
| Data Zones | Spare Areas | b6 | write |
| INFO | Control Data Zones | b5 | write |
| | | b4 | read |
| Data Zones | User Data Area | b3 | write |
| | | b2 | read |
| INFO | PAC Cluster | b1 | write |
| | | b0 | read |

FIG. 8

| Contents | Number of bytes |
|---|---|
| TDDS identifier = "DS" | 2 |
| TDDS format = 00h | 1 |
| ⋮ | ⋮ |
| Location of LSN 0 of User Data Area | 4 |
| Last LSN of User Data Area | 4 |
| ⋮ | ⋮ |
| PAC Status L0 | 16 |
| PAC Status L1 | 16 |
| ⋮ | ⋮ |

FIG. 9B

| PAC status Bitmap | PAC 2 Zone | b63,b62 | b61,b60 | ... | b3,b2 | b1,b0 |
|---|---|---|---|---|---|---|
| | PAC 1 Zone | b63,b62 | b61,b60 | ... | b3,b2 | b1,b0 |

{location1 location2} ... {location31 location32}

FIG. 9C

| $b_{N+1}, b_N$ | contents in PAC Location |
|---|---|
| 0 0 | Unrecorded |
| 0 1 | Reserved for BD-R (In the BD-RE, It represents 4 byte PAC_ID is 00 00 00h or FF FF FFh) |
| 1 0 | Indicates defective location or an invalid PAC |
| 1 1 | Contains a valid PAC |

FIG. 10B

| PAC status Bitmap | PAC 2 Zone | 1 | 1 | 1 | 0 | 0 | 0 | ... | 0 | 0 |
|---|---|---|---|---|---|---|---|---|---|---|
| | PAC 1 Zone | 1 | 1 | 1 | 1 | 0 | 0 | ... | 0 | 0 | location1 location2 location3 location4 ... location32

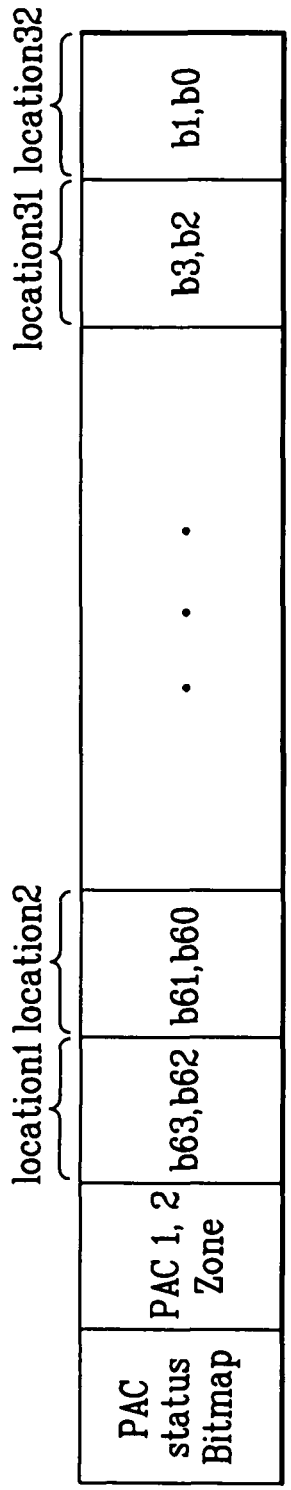

FIG. 11D

| PAC status Bitmap | PAC 1, 2 Zone | 1 0 | 1 1 | 1 0 | 1 1 | ... | 0 0 |
|---|---|---|---|---|---|---|---|

FIG. 13

| Contents | Number of bytes |
|---|---|
| TDDS identifier = "DS" | 2 |
| TDDS format = 00h | 1 |
| • • • | |
| Location of LSN 0 of User Data Area | 4 |
| Last LSN of User Data Area | 4 |
| • • • | |
| PAC Clusters Defect Status | 8 |
| PAC Allocated space | 8 |
| • • • | |

FIG. 14A

| PAC #1 | (location 1) |
| PAC #2 | (location 2) |
| ⋮ | ⋮ |
| PAC #31 | (location 31) |
| PAC #32 | (location 32) |

< INFO2/PAC2 >

FIG. 14B

| PAC Clusters Defect Status Bitmap | PDS 31 | PDS 30 | ... | PDS 1 | PDS 0 |
|---|---|---|---|---|---|
| PAC Allocated Space Bitmap | PSB 31 | PSB 30 | ... | PSB 1 | PSB 0 | location1 location2 ... location31 location32

- PDS bit : Show the status of the PAC clusters
  - 0b : To indicate that the PAC Cluster N is non-defective
  - 1b : To indicate that the PAC Cluster N is defective

- PSB bit : Show the allocation status of the PAC clusters
  - 0b : To indicate that the PAC Cluster N is newly allocatable
  - 1b : To indicate that the PAC Cluster N is allocated

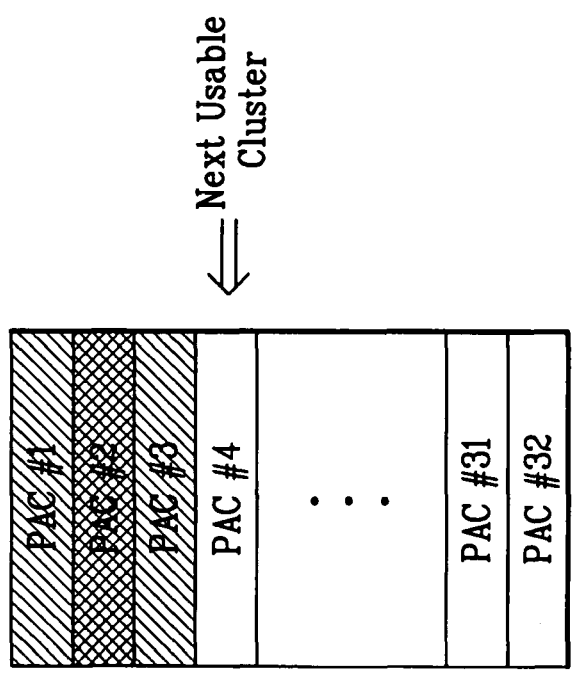

RECORDING MEDIUM WITH PHYSICAL ACCESS CONTROL (PAC) CLUSTER THEREON AND APPARATUS AND METHODS FOR FORMING, RECORDING, AND REPRODUCING THE RECORDING MEDIUM

CROSS-REFERENCE TO RELATED APPLICATIONS

This U.S. non-provisional application claims priority of U.S. provisional application Ser. No. 60/554,356 filed on Mar. 19, 2004, U.S. provisional application Ser. No. 60/566,090 filed on Apr. 29, 2004, U.S. provisional application Ser. No. 60/577,181 filed on Jun. 7, 2004, and Korean Application No. 10-2004-0039142, filed on May 31, 2004, in the Korean Intellectual Property Office, the entire contents of each of which are hereby incorporated by reference.

BACKGROUND OF THE INVENTION

1. Field of the Invention

The present invention relates to managing physical access control (PAC) and recording data, media containing PAC and recording data (for example, high density optical discs, such as Blu-ray Disc) and apparatus and methods for recording and/or reproducing data to and/or from the media.

2. Discussion of the Related Art

Media, for example, optical discs may be used for recording a large quantity of data. Of the optical discs available, a new high density optical media (HD-DVD), for example, the Blu-ray Disc (hereafter called as "BD") is under development, which enables increased recording and/or storing of high definition video and/or audio data.

BD further includes a rewritable Blu-ray disc (BD-RE), Blu-ray disc writable once (BD-WO), and Blu-ray disc read only (BD-ROM).

Currently, one problem with existing systems is the potential incompatibility between drives of different versions, for example a drive of a previous version with a previous set of capabilities may have difficulty interacting with a medium that has interacted with a drive including at least one capability from a subsequent set of capabilities.

SUMMARY OF THE INVENTION

Example embodiments of the present invention provide a PAC cluster on a medium, such as a high density optical disc, and apparatus and methods for recording data to and reproducing data from the medium using a PAC cluster.

Example embodiments of the present invention provide physical access control (PAC) clusters recorded thereon, in order to improve data protection, improve data management, improve reproduction compatibility, avoid destruction of data, and/or reduce unnecessary, repetitive operations.

Example embodiments of the present invention provide a medium, such as a high density optical disc, and apparatus and methods for managing a PAC cluster.

In an example embodiment, the present invention is directed to a recording medium including at least one physical access control (PAC) zone including at least one physical access control (PAC) cluster and at least one management area containing status information for managing recording to and/or reproducing from the recording medium, for each of the at least one PAC clusters, wherein the status information includes invalid status for each PAC cluster.

In an example embodiment, the present invention is directed to a method of updating status information in a recording medium, the status information being associated with at least one physical access control (PAC) cluster in a PAC zone, the method including when a PAC cluster is updated, recording an updated PAC cluster to a next recordable cluster location within the PAC zone and updating the status information by recording status information of the PAC cluster as invalid and recording status information of the updated PAC cluster as valid.

In an example embodiment, the present invention is directed to a method of updating status information in a recording medium, the status information being associated with at least one physical access control (PAC) cluster in a PAC zone, the method including if a PAC cluster is found to be defective during recording or reproducing the PAC cluster, recording data of the PAC cluster to a next recordable PAC cluster location within the PAC zone and updating the status information by recording status information of the PAC cluster as invalid/defective, and recording status information of the next recordable PAC cluster containing the data of the PAC cluster as valid.

In an example embodiment, the present invention is directed to a method of updating a physical access control (PAC) cluster on a write-once recording medium, including recording a PAC cluster in a PAC zone and updating the PAC cluster, wherein status information of a previous version of the PAC cluster is marked as invalid and status information of an updated version of the updated PAC cluster is marked as valid, wherein the updated version of the PAC cluster is recorded to an another available cluster location in the PAC zone.

In an example embodiment, the present invention is directed to an apparatus for recording to and/or reproducing from a recording medium including a driver for driving an optical recording device to record data on the recording medium or reproduce data from the recording medium and a controller for controlling the driver to record or reproduce the data based on at least one physical access control (PAC) zone including at least one physical access control (PAC) cluster and at least one management area containing status information for each of the at least one PAC clusters, wherein when a PAC cluster is updated, said controller records an updated PAC cluster to a next recordable cluster location within the PAC zone and updates the status information by recording status information of the PAC cluster as invalid and recording status information of the updated PAC cluster as valid.

In an example embodiment, the present invention is directed to an apparatus for recording to and/or reproducing from a recording medium including a driver for driving an optical recording device to record data on the recording medium or reproduce data from the recording medium and a controller for controlling the driver to record or reproduce the data based on at least one physical access control (PAC) zone including at least one physical access control (PAC) cluster and at least one management area containing status information for each of the at least one PAC clusters, wherein if a PAC cluster is found to be defective during recording or reproducing the PAC cluster, said controller records data of the PAC cluster to a next recordable PAC cluster location within the PAC zone, updates the status information by recording status information of the PAC cluster as invalid/defective, and records status information of the next recordable PAC cluster containing the data of the PAC cluster as valid.

In an example embodiment, the present invention is directed to an apparatus for recording to and/or reproducing from a write-once recording medium including a driver for driving an optical recording device to record data on the write-once recording medium or reproduce data from the write-once recording medium and a controller for controlling the driver to record or reproduce the data based on at least one physical access control (PAC) zone including at least one physical access control (PAC) cluster and at least one management area containing status information for each of the at least one PAC clusters, wherein said controller records a PAC cluster in a PAC zone and updates the PAC cluster, said controller marks status information of a previous version of the PAC cluster as invalid and marks status information of an updated version of the updated PAC cluster as valid, and said controller records the updated version of the PAC cluster to an another available cluster location in the PAC zone.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of example embodiments of the invention and are incorporated in and constitute a part of this application, illustrate example embodiment(s) of the invention where.

FIG. 4 illustrates a structure of the PAC in a high density optical write-once disc according to an example embodiment of the present invention;

FIG. 5 illustrates a configuration of an "Unknown PAC Rules" field according to an example embodiment of the present invention;

FIG. 8 illustrates a TDDS structure in a high density optical write-one disc according to an example embodiment of the present invention;

FIGS. 9A to 9C illustrate a method for recording a PAC zone and PAC status information in a high density optical write-once disc according to an example embodiment of the present invention;

FIGS. 10A and 10B illustrate an example of a PAC zone and PAC status information being recorded in a high density optical write-once disc according to an example embodiment of the present invention;

FIGS. 11A to 11D illustrate a method for recording a PAC zone and PAC status information according to another example embodiment of the present invention;

FIG. 13 illustrates a structure of a TDDS in a high density optical write-once disc according to another example embodiment of the present invention;

FIGS. 14A and 14B illustrate a method for recording a PAC zone and PAC status information in a high density optical write-once disc according to another example embodiment of the present invention;

FIGS. 15A and 15B illustrate an example of a PAC zone and PAC status information being recorded in a high density optical write-once disc according to another example embodiment of the present invention.

DETAILED DESCRIPTION OF EXAMPLE EMBODIMENTS OF THE INVENTION

Reference will now be made in detail to example embodiments of the present invention, which are illustrated in the accompanying drawings. Wherever possible, the same reference numbers will be used throughout the drawings to refer to the same or like parts.

In an example embodiment, in addition to its ordinary and customary meaning, the term "physical access control (PAC)" may also include additional information being recorded on the disc for managing/controlling data recording and reproduction for an entire disc or a specific segment within a physical zone of the disc. The term "physical access control (PAC)" may be referred to as "PAC", "PAC information", and/or "PAC control information" for simplicity. In addition, a zone within the disc on which the PAC is recorded may be referred to as a "PAC zone" and the PAC being recording in the PAC zone in cluster units may be referred to as a "PAC cluster" for simplicity. Furthermore, a PAC according to example embodiments of the present invention may include an "unknown rule", which may restrict read/write of data for the entire disc or a specific segment, for a drive having a specifically unknown PAC_ID and including a drive of a previous version (for example, a "legacy" version"). A PAC having an "unknown rule" applied thereto may be referred to as an "Unknown PAC". Similarly, a known specific PAC_ID recorded on the PAC may be referred to as a "known rule" and "PAC specific information" that is applied to the PAC may be referred to as a "Known PAC".

Figure 1:
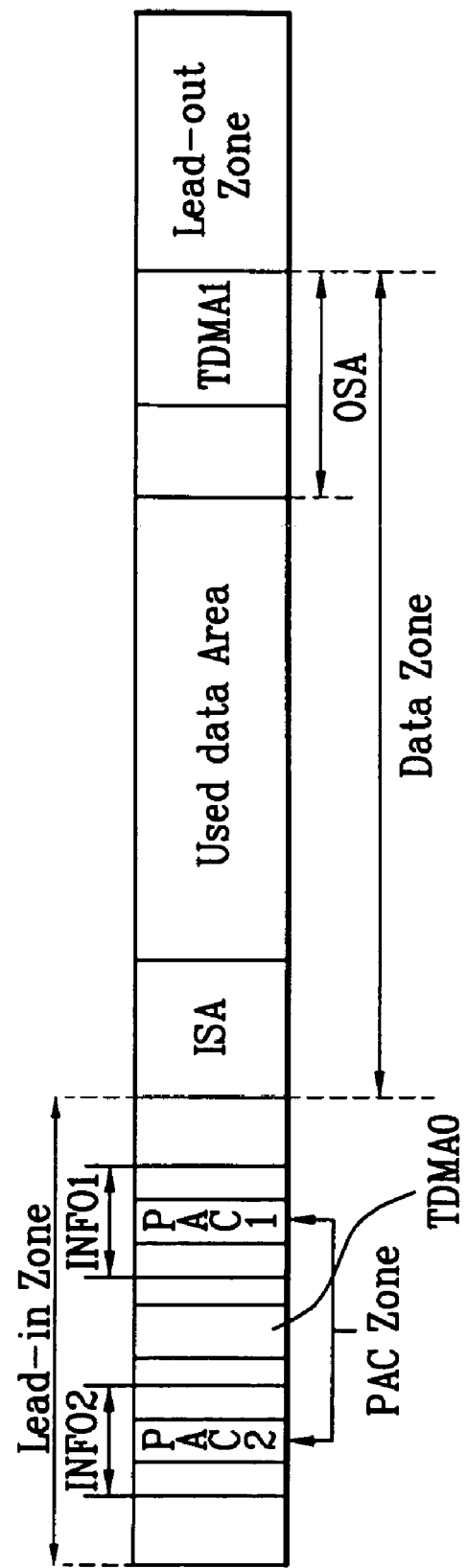
FIG. 1 illustrates an overall structure of a high density optical write-once disc according to an example embodiment of the present invention.

An example structure of a PAC recorded on a PAC zone will now be described in detail with reference td the accompanying drawings. FIG. 1 illustrates an overall structure of a high density optical write-once disc according to an example embodiment of the present invention. Referring to FIG. 1, the high density optical write-once disc may be partitioned, from an inner circumference to an outer circumference, into a lead-in zone, a data zone, and a lead-out zone. The lead-in zone may further include a temporary disc management area (TDMA) further including defect management and recording management zones of the optical disc. For a high density optical write-once disc, the TDMA can physically record data on the disc only once. Accordingly, in order to record defect management and recording management information on the disc, which can be updated one or more times during the life of the disc, additional TDMAs may be also be included in an inner spare area (ISA) or an outer spare area (OSA) within the data zone. A TDMA may include a first physical sector number of a defect list, a temporary disc definition structure (TDDS) containing information, such as the location of the data zone, and/or a temporary defect list (TDFL).

The lead-in zone may further be partitioned into an INFO2 zone and an INFO1 zone for recording various kinds of information thereon. The INFO2 zone and/or the INFO1 zone may include PAC (Physical Access Control) zones. The PAC zone assigned to the INFO2 zone may be referred to as a PAC2 zone and the PAC zone assigned to the INFO1 zone may be referred to as a PAC1 zone. One of the PAC2 zone and the PAC1 zone may have an original PAC recorded thereon and the other may act as a back-up zone for recording a copy of the original PAC.

As described above, the PAC zone may controls read/write of data for the entire disc or a specific segment and, therefore, may include an "unknown rule" for restricting the read/write functions of a drive. The area of the disc being controlled by the "unknown rule" may include a disc management area (DMA), a spare area, a user data area, and/or other relevant areas. More specifically, the user data area can be sectioned into segment areas defined on the disc, to which the "unknown rule" may be applied. Segments are discussed in more detail below.

An "unknown rule" may be used to ensure predictable operations of the disc, and may include controls for operation, such as reads, writes, and/or other similar operations, for linear replacement of a defective zone, logical overwrite of the high density optical write-once disc, and/or other similar operations. An area may be provided on the disc where the "unknown rule" is applicable, having segments for defining an entire disc, or a specific segment of the disc. Therefore, by defining an area a previous version drive (or legacy drive) is able to access by using the "unknown rule" of a PAC recorded in a PAC zone, a newer version of the optical disc can resolve any problems that may occur, but cannot be identified in a previous version, such as reducing unnecessary access operations of the previous version drive. Moreover, by defining an accessible area on a physical area of the disc for the previous version drive to access using a PAC, a data area having user data recorded thereon can be protected more robustly and/or unauthorized access (for example, hacking) of the disc may be prevented or reduced.

Figures 2, 3:
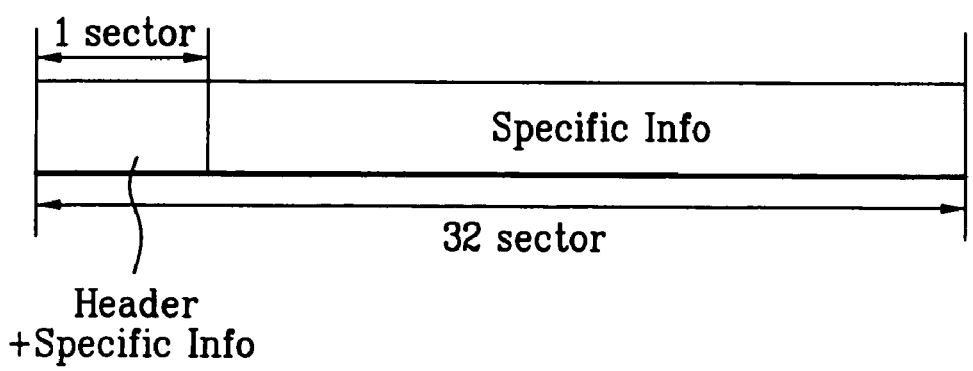
FIG. 2 illustrates an INFO2 zone and an INFO1 zone of a high density optical write-once disc according to an example embodiment of the present invention.
FIG. 3 illustrates a structure of a physical access control (PAC) being recorded on the high density optical write-once disc according to an example embodiment of the present invention.

The INFO2 zone and the INFO1 zone having the PAC2 zone and the PAC1 zone therein in the high density optical write-one disc will now be described in detail. FIG. 2 illustrates an INFO2 zone and an INFO1 zone of the high density optical write-once disc according to an example embodiment of the present invention. Referring to FIG. 2, the INFO2 zone may include 256 clusters including 32 clusters of PAC2 zone, 32 clusters of DMA (Defect Management Area) 2 for management of defects, 32 clusters of CD (Control Data) 2 zone having control information recorded thereon, and/or 32 clusters of BZ (Buffer Zone) 3 of a buffer zone. In addition, the INFO1 zone may have 256 clusters including 32 clusters of BZ2, 32 clusters of DMA1, 32 clusters of CD1, 32 clusters of PAC1, and/or 128 clusters of drive area.

A PAC zone according to an example embodiment of the present invention may be sectioned to have 32 clusters in each of the INFO2 zone and the INFO1 zone within the lead-in zone. A PAC zone having a size of 32 clusters may be sectioned so that each PAC is the size of one cluster. Further, the number of PACs each being the size of a single cluster may be selectable up to a maximum (for example, a maximum of 32 clusters). An example structure in which one PAC is recorded at the size of one cluster is described with reference to FIG. 3.

FIG. 3 illustrates a physical access control (PAC) recordable on a high density optical write-once disc according to an example embodiment of the present invention. Referring to FIG. 3, one PAC of one cluster size (32 frames or sectors) may include a header zone and/or a specific information zone specific to a particular disc drive (for example, optical disc drive). The PAC header zone may have 384 bytes allocated to a first frame of the PAC, for recording various kinds of PAC information, such as information on an "unknown PAC rule" and segments, and another area of the PAC zone may have information specific to the optical disc drive, also referred to as a "known rule", recorded thereon.

A more detailed structure of the above-mentioned example PAC having information recorded thereon is described with reference to FIG. 4. A more detailed description of a field of the PAC will follow with reference to a drawing illustrating the specific field corresponding to the PAC. FIG. 4 illustrates a PAC in a high density optical write-once disc according to an example embodiment of the present invention. Referring to FIG. 4, the PAC may include a header portion (up to 384 bytes of the first frame) and an area having specific information specific to the drive recorded thereon. More specifically, the header portion may include 3 bytes of "PAC_ID", 1 byte of "PAC format", 4 bytes of "PAC Update Account", 4 bytes of "Unknown PAC Rules", 1 byte of "Entire_Disc_Flags", 1 byte of "Number of Segments", and/or 32 "segments (Segment_0~Segment_31) each having 8 bytes.

The "PAC_ID" is a field that may include present PAC status and identification codes. For example, when the "PAC_ID" is recorded as '00 00 00h', the "PAC_ID" may indicate that the present PAC is not used. In case of a re-writable high density optical disc, when the "PAC_ID" is recorded as 'FF FF FFh', the "PAC_ID" may act as a code indicating that the present PAC zone has been previously used but is available for additional use (i.e., usable once again). Moreover, by recording the "PAC_ID" in specific bits, such as '54 53 54h', a "PAC_ID" can be used as a code for determining whether the present drive is capable of and/or permitted to have free and/or complete access to the disc. In other words, if the present drive is unable to acknowledge the "PAC_ID" applied as described above, then the present drive is determined to be incapable of acknowledging the inputted "PAC_ID" for some reason, such as mismatched versions. Thus, the '54 53 54h' bits may be used as a code requiring reference to information recorded on the "Unknown PAC Rules" field.

As described above, the "Unknown PAC Rules" field may be used as a field that designates an operation range of the drive that cannot acknowledge the present PAC, a more detailed description of which will follow with reference to FIG. 5. FIG. 5 illustrates a configuration of an "Unknown PAC Rules" field according to an example embodiment of the present invention. Referring to FIG. 5, control of and/or access to various areas on the disc may defined by an "Unknown PAC Rules" field, which may be expressed as 4 bytes (or 32 bits). In this example, the "Area" column in FIG. 5 represents the controllable/accessible areas on the disc, the "Number of bits" column represents the control bits, and the "Control type" column represents control types, such as read/write and/or other similar operations.

The controllable/accessible areas/zones of the "Unknown PAC Rules" field may include controls, such as write control of the "TDMA (excluding Temporary Disc Definition Structure (TDDS))", write control of the "Spare Areas" within the data zones, write and read control of control data (CD) zones within the INFO zone, write and read control of a "Segment Area" when a "User Data Area" or a segment area is defined in the data zone, and/or write and read control of a "PAC cluster" within the INFO zone. By using fields, such as those defined above, a controllable area within the disc for a drive having an unknown PAC_ID can be designated using the "Unknown PAC Rules". Therefore, the "Unknown PAC Rules" can be used for controlling access to the entire disc or a specific area within the physical zone of the disc, if there is a drive version mismatch or if the user wants to control access.

Returning to FIG. 4, a "PAC Update Count" field may be used to indicate a number of updates in the PAC (which may be initially set to '0'). The recorded number may be increased by one each time the PAC is re-written. The "Entire Disc Flag" field, shown in FIG. 4, may be used as a field applied to the entire area of the disc, regardless of the allocation of the segment area for the unknown PAC and may indicate whether re-initialization is allowed. In case of a high density optical write-once disc, re-initialization cannot be performed. In this case, the "Entire Disc Flag" field may be to indicate that the PAC is applicable to an entire area of the disc, and the "Number of Segments" field is a field representing a number of segment area the PAC is applicable to.

The "Number of Segments" field may indicate the number of segment areas being applied to the PAC. The segment may include a maximum number (for example, 32) of segments that can be allocated to one PAC. Information on the allocated segments may be written on fields of "Segment_0" to "Segment_31", each which may include 8 bytes. The first physical sector number (PSN) of the first cluster in the segment area of the first 4 bytes may be recorded on each of the "Segment_0" field to the "Segment_31" field.

Figure 6:
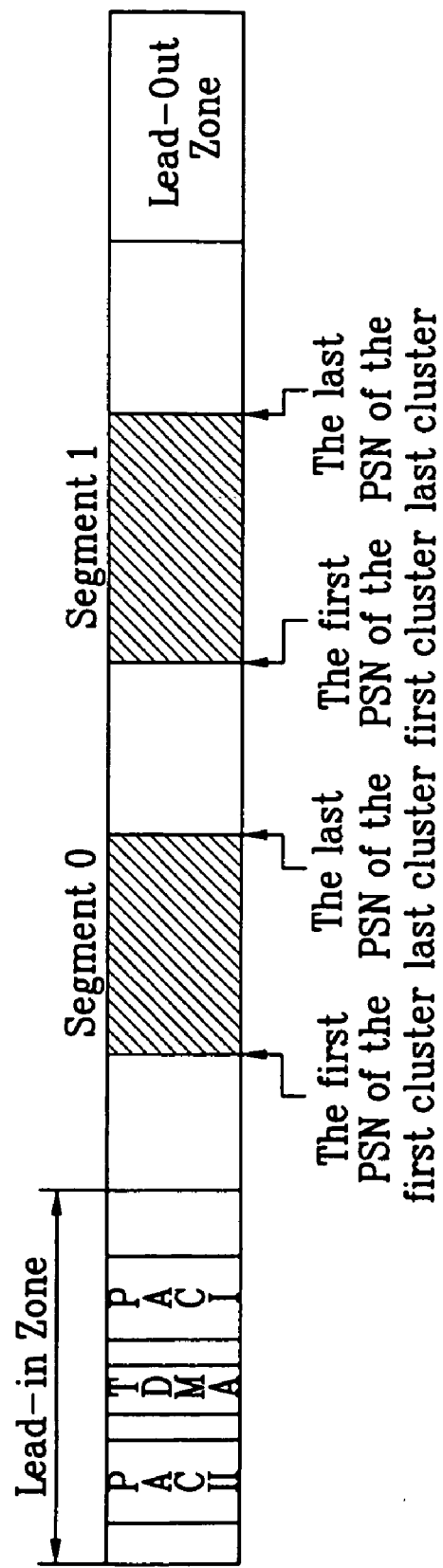
FIG. 6 illustrates segment zones in a high density optical disc according to an example embodiment of the present invention.

Segments are described in more detail with reference to FIG. 6. FIG. 6 illustrates segment zones in a high density optical disc according to an example embodiment of the present invention. Referring to FIG. 6, there can be a maximum number (for example, 32) of segment areas in succession starting from "segment 0" if required on a high density optical disc, for applying the PAC thereto. Up to the maximum number (for example, 32) of segments can be allocated starting from "segment 0" in an ascending order for management by one PAC, and even if there are a plurality of PACs, a total number of the segment areas managed by the PACs should not exceed the maximum number (for example, 32).

In this example, by writing a starting location of the allocated segment area as the first PSN of the first Cluster and the last location of the allocated segment area as the last PSN of the last Cluster on the "Segment" fields, the optical disc drive can determine locations of the segment areas. In this example, none of the plurality of segments allocated, and managed by one PAC overlap with one another, and the starting and last locations are designated at boundaries of clusters.

Thus, in example embodiments, the present invention may provide a plurality of PACs, to manage a number (for example, 32) segment areas, which are described in more detail below.

Figure 7:
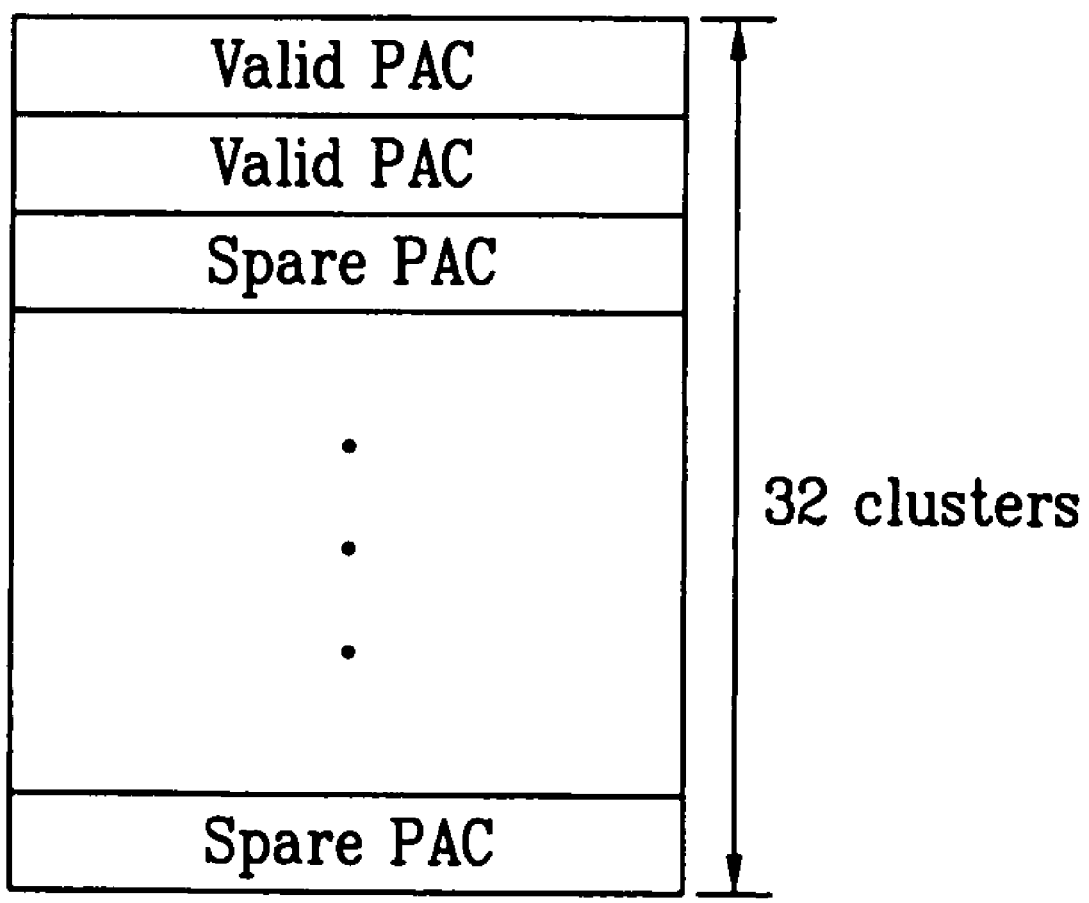
FIG. 7 illustrates a PAC zone in a high density optical write-once disc according to an example embodiment of the present invention.

FIG. 7 illustrates a structure of a PAC zone in a high density optical write-once disc according to an example embodiment of the present invention. Referring to FIG. 7, a plurality of "Valid PACs", each with one cluster size may be written on one PAC zone (a PAC zone of INFO2 or INFO1) of 32-cluster size, as required. A valid PAC may be a zone having various kinds of PAC information described above. A PAC that is not accessible by an optical disc drive, for reasons such as recording update, defect, and/or similar conditions, may be referred to as an "Invalid PAC".

As described above, a valid PAC may include a preset PAC_ID, depending upon a version of the optical disc drive on which the PAC is recorded and any unused PAC zones may remain as a spare PAC. In case of a re-writable optical disc, 00 bits (PAC_ID=00 00 00h) may occupy the spare PAC zone indicating that the zone has not been used, depending upon the settings of the optical disc drive, or may remain as an unrecorded (or not used) zone. However, in case of a high density optical write-once disc (BD-R), the information can only be physically recorded once on the disc. Therefore, until the recording is completed or until the disc is closed (where the user selects to no longer perform recording), the spare area may remain unrecorded.

In a PAC zone having the above-described structure, searching for the location of a valid PAC zone, or avoiding a zone no longer requiring recording (due to a previous recording and an invalid PAC zone in order to quickly locate a next recordable zone) has an affect on the recording speed of the disc (a plurality of retry processes may be required for reading a defective zone). Accordingly, example embodiments of the present invention include a method of recording various types of PAC-related status information, such as the location of the plurality of valid PACs, location of the next recordable PAC, and/or other related information, in a structure, such as a temporary disc definition structure (TDDS) until disc closing is performed. When disc closing is performed, the most recent TDDS information may be moved to a disc definition structure (DDS) of a separate disc management area (DMA) within the optical disc.

As described above, the TDDS may be a zone including information, such as a first physical sector number in a defect list, location of a user data area, and/or other similar information. More specifically, the information recorded in the TDDS of the disc may include a temporary defect list (TDFL) and/or TDDS information. The information recorded in the TDDS may be pre-scanned and pre-loaded upon the loading of the disc into the drive. Therefore, when various types of status information, such as the locations of the plurality of valid PACs and the next recordable PAC are recorded in the TDDS, the optical disc drive can easily acquire information on the PAC zone without having the scan the entire PAC zone.

An example structure of a TDDS including various types of information related to the status of the PAC zone will now be described. FIG. 8 illustrates a TDDS structure in a high density optical write-one disc according to an example embodiment of the present invention. Referring to FIG. 8, the TDDS of the high density optical write-once disc may include a "TDDS Identifier" field, a "TDDS Format" field, a "Location of LSN 0 of User Data Area" field indicating the location of a logical sector number (LSN) 0 in the user data area, a "PAC Status L0" field indicating the status information of the PAC, and/or a "PAC Status L1" field indicating the PAC status information for a dual layer disc.

The "PAC Status L0" field may include a total of 16 bits and may be used as a PAC2 zone of the INFO2 zone, as well as a field indicating the status of the PAC existing in the PAC1 zone of the INFO1 zone. If the disc is a dual layer disc, the "PAC Status L1" field may be to indicate which layer of a dual layer disc the PAC is recorded on.

Figure 9A:
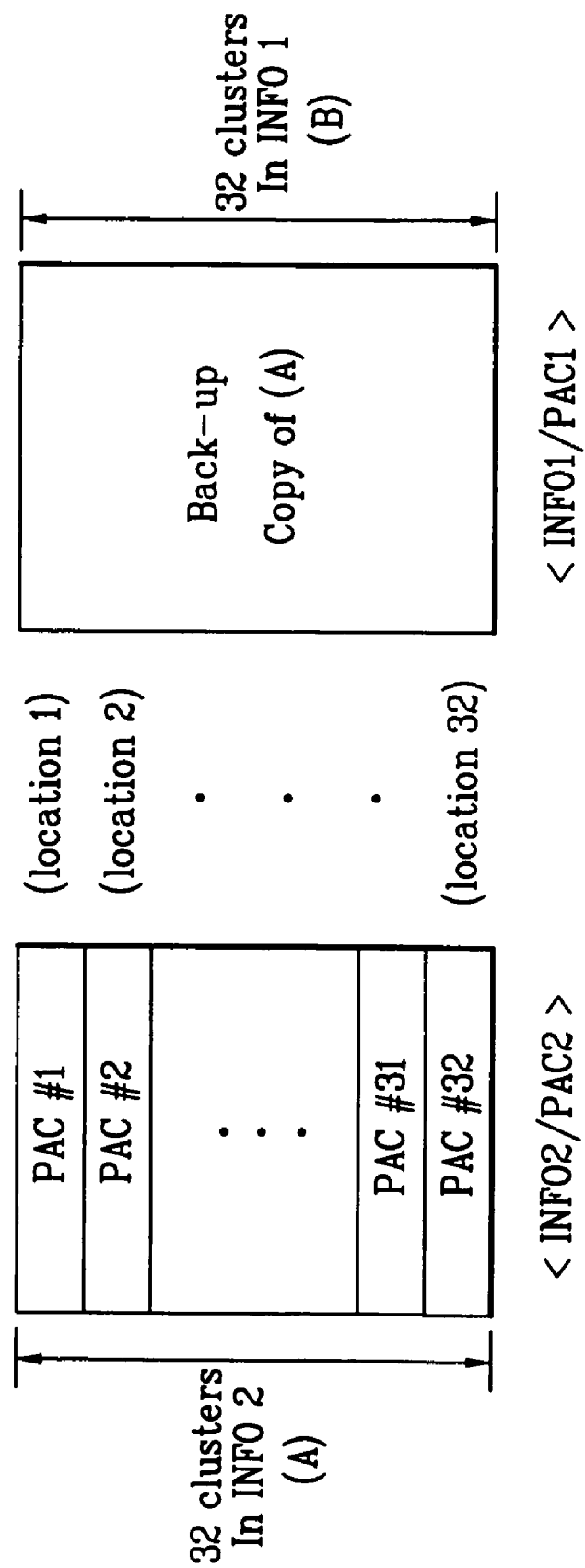

Example methods for recording the PAC status information in a TDDS will now be described in detail. FIGS. 9A to 9C illustrate a method for recording a PAC zone and PAC status information in the high density optical write-once disc according to an example embodiment of the present invention.

Referring to FIG. 9A, a maximum number (for example, 32) of PACs, each having the size of one cluster, can be allocated in the PAC2 zone of the INFO2 zone having 32 clusters allocated therein. The PAC recorded on the PAC2 zone may be the original PAC, and a copy of the original PAC may be recorded in the PAC1 zone of the INFO1 zone. The PAC1 zone of the INFO1 zone can also be the original PAC zone and the copy of the original can be recorded in the PAC2 zone of the INFO2 zone.

As shown in FIG. 9B, a single "PAC Status L0" field may use a total of 128 bits (or 16 bytes) to indicate the PAC status within the PAC2 zone of the INFO2 zone and the PAC1 zone of the INFO1 zone. In case of a dual layer disc, a total of 256 bits (or 32 bytes) may be used, since a "PAC Status L1" field may further be included therein. Accordingly, 2 bits may be used to represent information included in one PAC zone. For example, among the 64 bits having the PAC2 status information on the PAC Status Bitmap, bits b63 and b62 may contain the status information on PAC #1 (location 1) of the PAC2 zone, and bits b61 and b60 bits may contain the status information on PAC #2 (location 2) of the PAC2 zone. Sequentially allocated in a similar method, bits b1 and b0 bits may contain the status information on PAC #32 (location 32) of the PAC2 zone. In other words, 2 bits may be allocated to a PAC, thereby indicating the PAC status of the PAC2 zone. Similarly, the status information on the PAC1 zone may also be represented on the PAC Status Bitmap using the same method.

FIG. 9C illustrates the PAC status of a corresponding PAC zone represented by 2 bits. Referring to the example of FIG. 9C, when the 2 bits indicating the PAC status are '00', the corresponding PAC is not recorded. When the 2 bits are '01', the PAC is not used in a high density optical write-once disc. In case of a high density optical re-writable disc, the '01' bits can either be used as PAC_ID=00 00 00h indicating that the corresponding PAC has not been recorded, or a PAC_ID=FF FF FFh indicating that the PAC has been previously used but can be re-used. In addition, when the 2 bits are '10', either the corresponding PAC zone is a defective zone or the bits are used to indicate that the corresponding PAC is an invalid PAC. When the 2 bits are '11', the bits may be used to indicate that the corresponding PAC is a valid PAC.

Accordingly, the next recordable PAC zone is the PAC zone indicated by '00', which indicate the PAC status in the "PAC Status" field, and the location of the defective zone or the invalid PAC becomes a PAC zone indicated by '10'. Further, the location of the valid PAC is a PAC zone indicated by '11'. By using the above described method, the optical disc drive can acquire information on the location of a valid PAC, the location of a defective zone or an invalid PAC, the location of the next recordable PAC zone, among the PACs recorded on the PAC2 zone and the PAC1 zone, through the "PAC Status" field of the 16 bytes (or 32 bytes when using the dual layer disc) inserted in the TDDS area. A more detailed description will follow below.

Figure 10A:
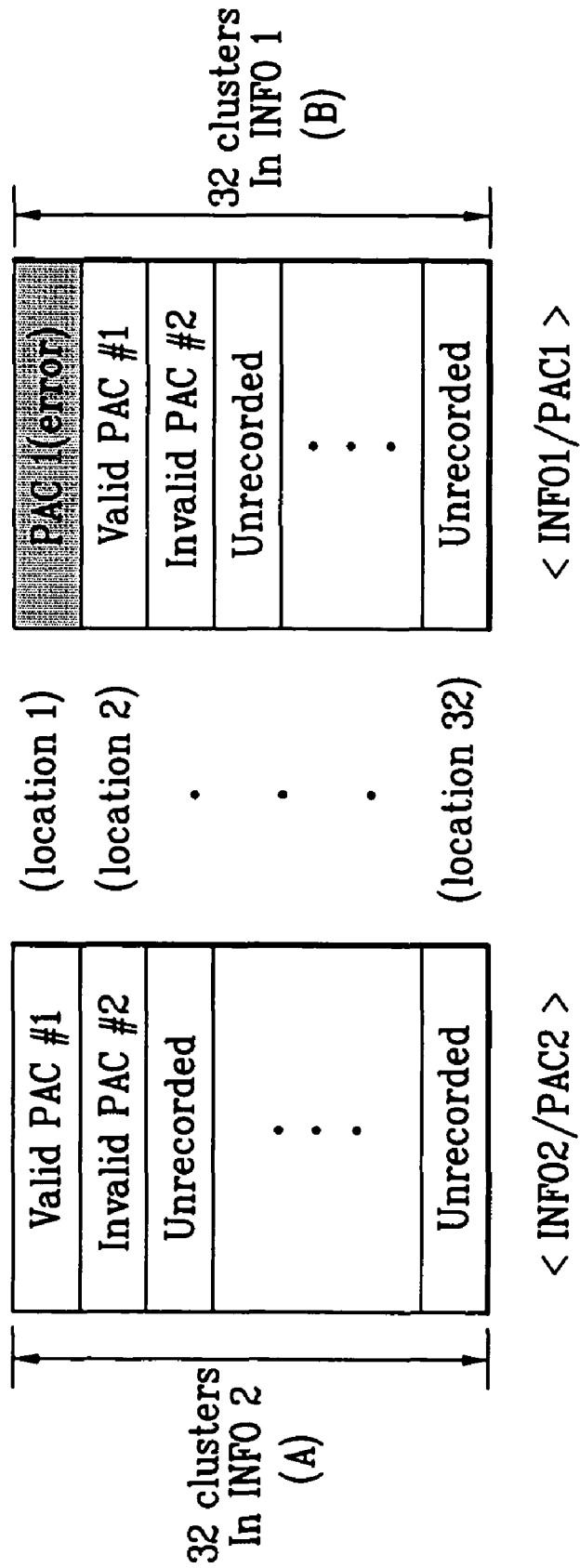

FIGS. 10A and 10B illustrate an example of a PAC zone and PAC status information being recorded in the high density optical write-once disc according to an example embodiment of the present invention. Referring to FIG. 10A, the PAC2 zone of the INFO2 zone having the original PAC recorded thereon may include a valid PAC, an invalid PAC, and an unrecorded PAC zone. The copy of the original PAC recorded on the PAC2 zone may be recorded on the PAC1 zone. At this point, an error may occur during the recording process, which may be caused, for example, if the corresponding PAC zone is a defective zone. Therefore, when an error occurs as described above, the corresponding PAC is recorded on the PAC zone subsequent to the error-occurring PAC zone. The same rule applies to when an error occurs during the recording of the original PAC.

FIG. 10B illustrates an example PAC zone being recorded in a "PAC Status" field of a TDDS indicating the PAC status information. More specifically, in the PAC2 zone of the INFO2 zone, PAC #1 (location 1) is a valid PAC and is recorded as '11' in the corresponding field of the "PAC Status" field and PAC #2 (location 2) is an invalid PAC and is recorded as '10' in the corresponding field. Being unrecorded, the rest of the zone is recorded as '00' on the corresponding field, thereby indicating unrecorded status. Meanwhile, in the PAC1 zone of the INFO1 zone, because an error may have occurred during recording (for example, due to a defect), PAC #1 (location 1) is identified as a defective zone and '10' is recorded on the corresponding field of the "PAC Status" field, and a next PAC #2 (location 2) is a valid PAC and '11' is recorded on the corresponding field. A next PAC #3 (location 3) is an invalid PAC and '10' is recorded on the corresponding field. The rest of the zone is unrecorded and '00' is recorded on the corresponding field.

Figure 11A:
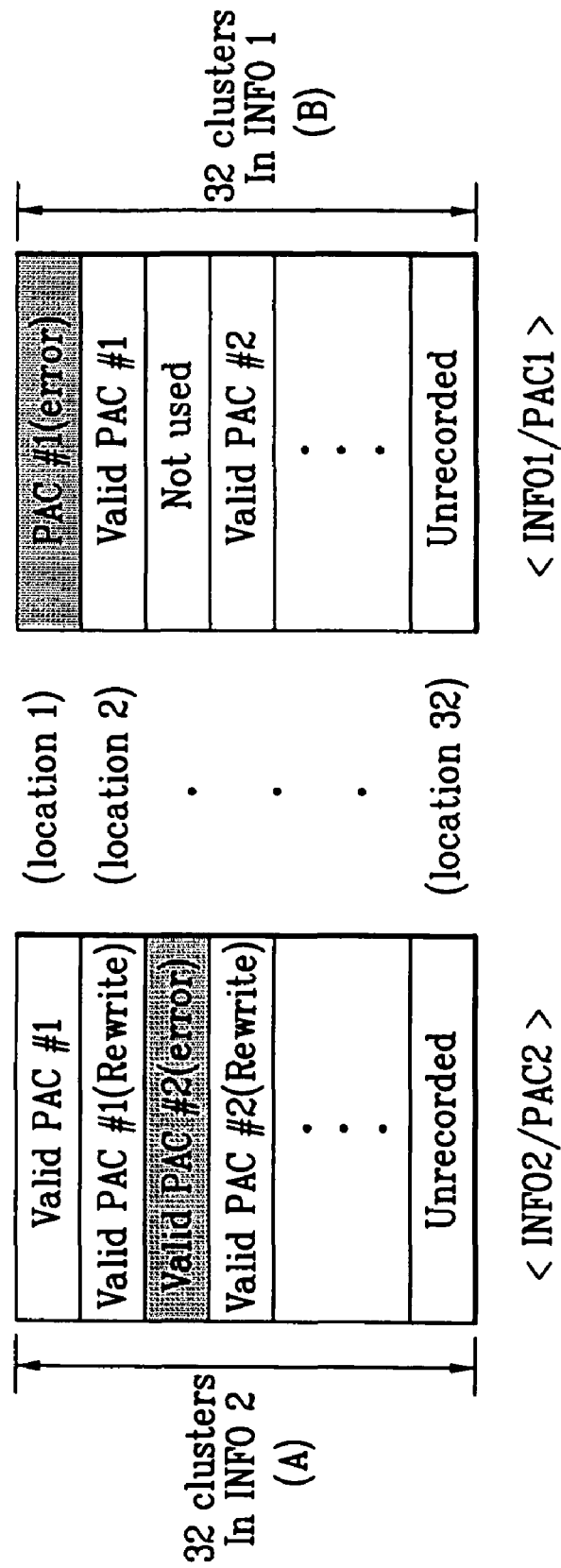

FIGS. 11A to 11D illustrate a method for recording a PAC zone and PAC status information according to another example embodiment of the present invention. Referring to FIG. 11A, the original PAC may be recorded on the PAC2 zone of the INFO2 zone, and the copy of the original PAC may be recorded on the PAC1 zone. In the method according to another example embodiment of the present invention, when an error occurs on one side during recording, the recording zone of the corresponding side is not used. The same rule may be applied to errors detected during reading (or representation). More specifically, when an error occurs in a zone 1 (location 1) of the PAC1 zone having the copy of the original PAC recorded thereon, the corresponding zone 1 (location 1) of the PAC2 zone is also unused. Then, the PAC is re-written on the zone subsequent to zone 1.

Similarly, when an error occurs in zone 3 (location 3) of the PAC2 zone having the original PAC recorded thereon, the corresponding PAC is recorded on a zone subsequent to zone 3. Accordingly, the corresponding zone 3 of the PAC1 zone is also unused, and the copy of the original PAC is recorded on a zone subsequent to zone 3 of the PAC1 zone. When using the above-described example method, the PACs being recorded on the PAC2 zone and the PAC1 zone, respectively, are identical and located in the same zone. Therefore, if an error occurs while the driver reads the PAC2 zone of the INFO2 zone, the driver can alternatively access and read the PAC located in the same zone in the PAC1 zone of the INFO1 zone without requiring any additional information.

Moreover, when representing the status information of the PAC zone being recorded on the TDDS, a PAC may be recorded on identical locations on the PAC2 zone and the PAC1 zone, and so only the information of either one of the PAC2 and PAC1 zones can be indicated. A more detailed description will follow with reference to FIG. 11B. Referring to FIG. 11B, 8 bytes may be used in the "PAC Status" field of the TDDS (or 16 bytes when using a dual layer disc), and the indication of the status information of only one of the PAC2 zone and the PAC1 zone is required. When the status information is indicated by using 2 bitmaps, as described in the example embodiment shown in FIG. 9B, the 2 bitmaps may contain the same information. The 2-bit information being recorded is shown in FIG. 11C, which is represented by using the same example method described in FIG. 9C.

The PAC zone recorded as shown in FIG. 11A may be recorded in the "PAC status" field, as shown in FIG. 11D. More specifically, referring to FIG. 11D, in the PAC2 zone or the PAC1 zone, zone 1 (location 1) is an error zone and '10' is recorded in the corresponding field, zone 2 (location 2) is a valid PAC and '11' is recorded in the corresponding field, zone 3 (location 3) is an error zone and '10' is recorded in the corresponding field, and zone 4 (location 4) is a valid PAC and '11' is recorded in the corresponding field. The rest of the zone is unrecorded and '00' is recorded on the corresponding field.

Figure 12:
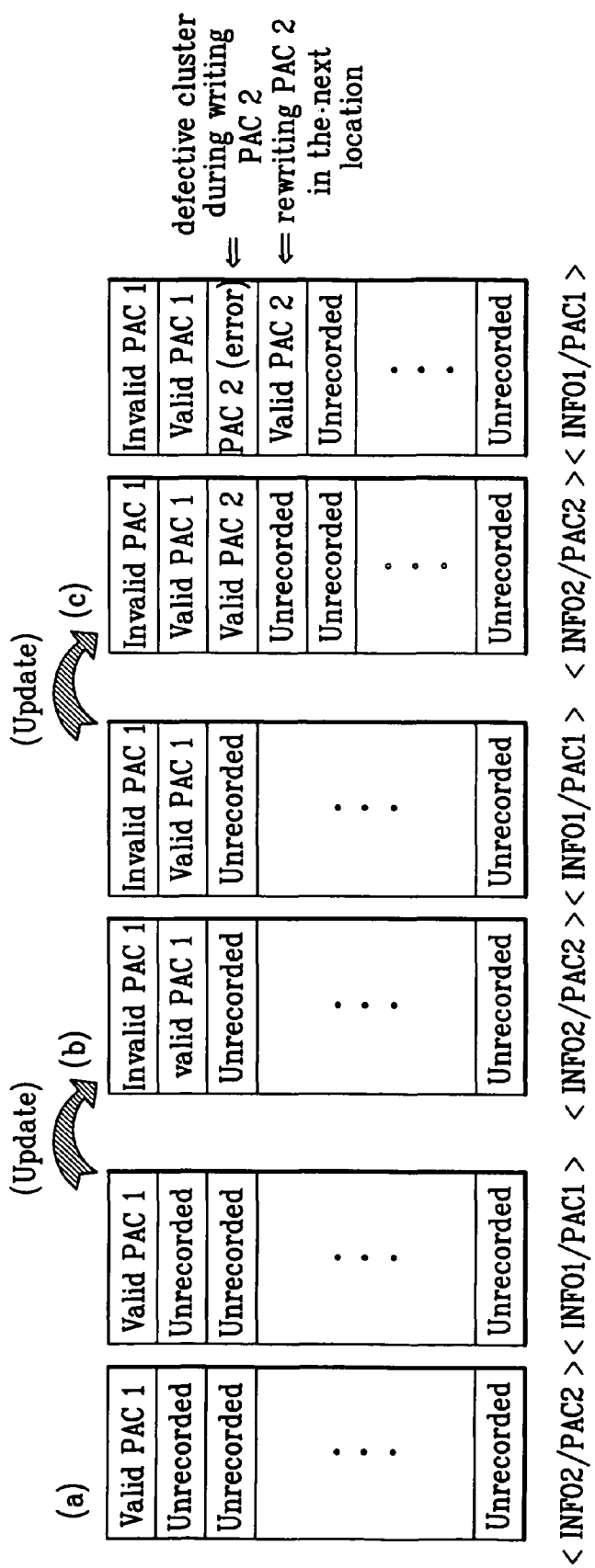
FIG. 12 illustrates a method for displaying PAC status information on a TDDS according to an example embodiment of the present invention, when a recorded PAC is updated.

FIG. 12 illustrates a method for displaying PAC status information on a TDDS when the recorded PAC according to an example embodiment of the present invention is updated. Referring to FIG. 12 and, more particularly, to part (a), a PAC may be recorded on the PAC2 zone of the INFO2 zone and the PAC1 zone of the INFO1 zone, and the PAC status information may be recorded in the "PAC Status" field of the TDDS. An example of a field having a single valid PAC (PAC 1) is described. For a PAC recorded as described above, an update of the recorded single valid PAC information may be required. In this example, when the optical disc is a high density optical re-writable disc, the information can be re-written using an overwriting method. However, in case of a high density optical write-once disc, an overwriting method cannot be used.

Therefore, when using a high density optical write-once disc, the updated valid PAC may be recorded on a next zone subsequent to the PAC 1, as shown in part (b) of FIG. 12. Eventually, the previously recorded PAC 1 become an invalid PAC, and the corresponding status information is updated from '11', which initially indicated that PAC 1 was a valid PAC, to '10'. Also, since the newly updated next valid PAC 1 is updated from an initially unrecorded zone to a valid PAC, the PAC status is updated from '00' to '11'.

Further, as shown in part (c) of FIG. 12, when recording a next valid PAC 2, a copy of the valid PAC 2 may be recorded in the PAC1 zone of the INFO 1 zone. At this point, an error may occur during the process of recording the valid PAC 2 in the PAC1 zone of the INFO1 zone. If an error occurs, the valid PAC 2 may be recorded on a next recordable zone subsequent to the error zone. Accordingly, by recording the valid PAC 2, the PAC status information representing the PAC2 zone may be updated from '00', which initially indicated that PAC 2 was an unrecorded zone, to '11'. Moreover, since an error occurred during the process of recording the valid PAC 2, the PAC status information representing the PAC1 zone may be updated from '00' to '10'. Further, because the valid PAC 2 is recorded on a next recordable zone, the PAC-status information is updated from '00' to '11'.

Although not shown, when an error occurs in a zone, which is initially a valid PAC at the time of reading, the status information may be updated from '11' to '10'. Furthermore, the TDDS information may be continuously updated as required, within the TDMA, prior to disc closing. Further, s mentioned previously, if the TDMA is insufficient, an additional TDMA may be allocated.

FIG. 13 illustrates a TDDS in a high density optical write-once disc according to another example embodiment of the present invention. Referring to FIG. 13, the TDDS of the high density optical write-once disc may include a "TDDS Identifier" field, a "TDDS Format" field, a "Location of LSN 0 of User Data Area" field indicating the location of a logical sector number (LSN) 0 in the user data area, a "Last LSN of User Data Area" field indicating the last logical sector number (LSN) in the user data area, a "PAC Clusters Defect Status" field indicating an error status of a PAC, and/or a "PAC Allocated Space" field indicating the allocated status of the PAC zone. Further, in the TDDS having the above-described example structure, the "PAC Clusters Defect Status" field and the "PAC Allocated Space" field may be used to indicate various types of PAC status information, such as the location of a cluster having a defective cluster and a valid PAC allocated therein in the PAC zone.

A method for indicating PAC status information by using a "PAC Clusters Defect Status" field and/or a "PAC Allocated Space" field will now be described in detail. FIGS. 14A and 14B illustrate a method for recording a PAC zone and PAC status information in the high density optical write-once disc according to another example embodiment of the present invention. Referring to FIG. 14A, a total number (for example, 32) of PACs can be recorded in a single PAC zone.

For each of the recorded PACs, in order to indicate the defects in the PAC clusters, 32 bits may be used in the "PAC Clusters Defect Status" field, as shown in FIG. 14B. 64 bits may be required in order to also indicate the status of the PAC1 zone having the copy of the original PAC recorded thereon, and 128 bits may be required for a dual layer disc.

More specifically, referring to FIG. 14B, a PAC defect status (PDS) N bit may be used to indicate the defect status of a corresponding cluster. '0' may be used to indicate that the PAC cluster N is not a defective area, and '1' may be used to indicate that PAC cluster N is a defective area. PDS 31 bit and PDS 30 bit may be sequentially allocated to indicate the status of PAC #1 zone and PAC #2 zone, respectively. 32 PDS bits may be provided to indicate a possible defect status within the single PAC zone. In addition, 32 bits may be used in the "PAC Allocated Space" field in order to indicate the allocated status of the PAC zone. Similarly, 64 bits may be used in order to indicate the status of the PAC1 zone having a copy of the original PAC recorded thereon and 128 bits may be needed for a dual layer disc.

The PAC status bit (PSB) N bit, shown in FIG. 14B, may be used to indicate the allocated status of the PAC zone. '0' may be used to indicate that the PAC cluster N is in a newly allocatable status (e.g., the corresponding PAC is unused), and '1' may be used to indicate that the PAC cluster N has already been used. As shown in the description of the PDS bit, the PSB bits may be sequentially allocated from PAC #1 to PAC #30. PSB 31 bit may be used to indicate the status of PAC #1 zone, PSB 30 may be used to indicate the status of PAC #2 zone, and so on.

FIGS. 15A and 15B illustrate an example of a PAC zone and PAC status information recorded in a high density optical write-once disc according to another example embodiment of the present invention. Referring to FIG. 15A, PAC #1, PAC #2, and PAC #3 are allocated in the TDDS. Referring to FIG. 15B, when the PAC #2 is a defective area, the PDS bit indicating the PAC #2 zone in the bitmap of the "PAC Clusters Defect Status" field is recorded as '1'. The PSB 31, PSB 30, and PSB 29 each indicating the PAC #1, PAC #2, and PAC #3 zones, respectively, in the bitmap of the "PAC Allocated Space" field indicating the allocation status are also recorded as '1'. Accordingly, through the above-described example TDDS information, an optical disc driver can identify the PAC #4 zone as the next recordable zone.

Figure 16:
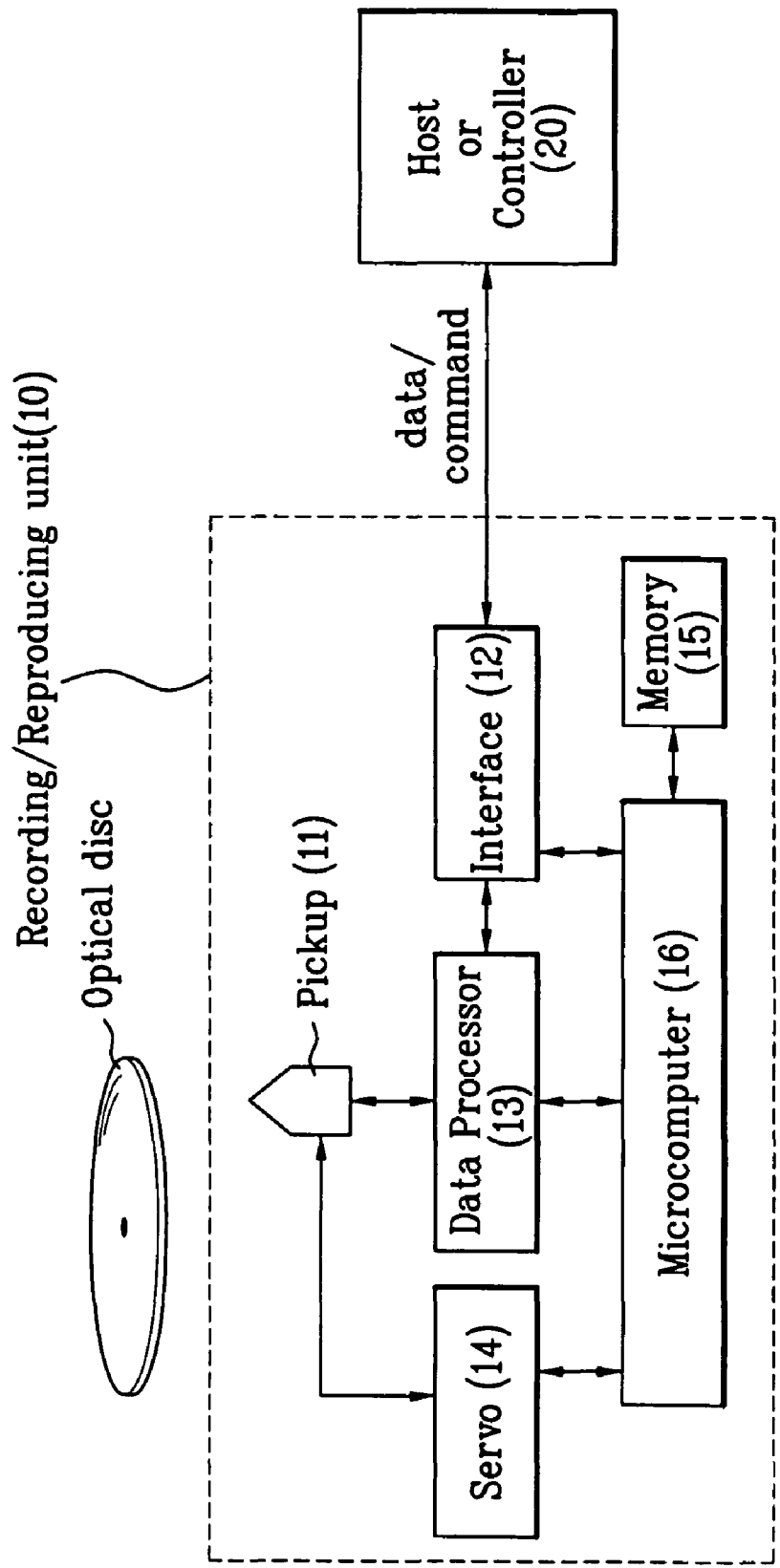
FIG. 16 illustrates a block diagram of an apparatus for recording and reproducing in a high density optical write-once disc according to an example embodiment of the present invention.

FIG. 16 illustrates a block diagram of an apparatus for recording and/or reproducing in a high density optical write-once disc according to an example embodiment of the present invention. Referring to FIG. 16, the optical recording/reproducing apparatus may include a recording/reproducing device 10 for performing recording/reproduction to/from the optical disc, and a host, or controller 20 for controlling the recording/reproducing device 10. In an example embodiment, the recording/reproducing device 10 may act as the "optical disc drive" discussed above in conjunction with many example embodiments of the present invention.

In an example embodiment, the host 20 gives a writing or reproduction instruction to write to or reproduce from a particular area of the optical disc to the recording/reproducing device 10 and the recording/reproducing device 10 performs the recording/reproduction to/from the particular area in response to the instruction from the host 20.

The recording/reproducing device 10 may further include an interface part 12 for performing communication, such as exchange of data and instructions, with the host 20, a pickup part 11 for writing data to and/or reading data from the optical disc, a data processor 13 for receiving a signal from the pickup part 11, and recovering a desired signal value or modulating a signal to be written into a signal able to be written on the optical disc, a servo part 14 for controlling the pickup part 11 to read a signal from the optical disc accurately, or write a signal on the optical disc accurately, a memory 15 for temporary storage of various kinds of information including management information and data, and a microcomputer 16 for controlling various parts of the recording/reproducing device 10.

A method for recording a PAC on a high density optical write-once disc using the example optical recording/reproducing apparatus will be described. Upon inserting the optical disc into the optical recording/reproducing apparatus, management information may be read from the optical disc and stored in the memory 15 of the recording/reproducing device 10, for use at the time of recording/reproduction of the optical disc. In this state, if the user desires to write on a particular area of the optical disc, the host 20, taking this as a writing instruction, provides information on a desired writing location to the recording/reproducing device 10, together with a data to be written.

The microcomputer 16 in the recording/reproducing device 10 may then receive the writing instruction, determine if the area of the optical disc the host 20 desires to write is a defective area or not from the management information stored in the memory 15, and perform data writing according to the writing instruction from the host 20 on an area which is not the defective area. If it is determined that writing on an entire disc or on a particular area of the disc includes new features which a previous version of the recording/reproducing device is not provided with, leading the previous version of the recording/reproducing device to fail to sense, or if it is intended to restrict functions, such as writing or reproducing to/from a particular area of the disc according to restriction set by the user, the microcomputer 16 of the recording/reproducing device 10 may write control information of the area in the PAC zone on the disc as an "Unknown PAC rule". The microcomputer 16 of the recording/reproducing device 10 may also write PAC information, such as the PAC_ID for a written state, and segment information which is control information on the particular area of the disc.

The PAC information may be written as a plurality of valid PACs on the PAC2 zone of the INFO2 zone at a one cluster size and a copy of the valid PACs recorded on the PAC2 zone may be recorded on the PAC1 zone of the INFO1 zone as a backup. In this example, the microcomputer 16 may provide location information on the area the data is written thereon, or the PAC zone, and the data to the servo 14 and the data processor 13, so that the writing is finished at a desired location on the optical disc via the pickup part 11.

A method for recording/reproducing a high density optical disc having a PAC written thereon in accordance with an example embodiment of the present invention will be described. Upon inserting an optical disc into the optical recording/reproducing apparatus, management information may be read from the optical disc and stored in the memory 15 of the recording and reproducing device 10, for use at the time of recording and reproduction of the optical disc. The information in the memory 15 may include location information on various zones in the PAC zone on the disc. Then, a PAC_ID of the PAC in the PAC zone may be identified, for determining if the PAC_ID is an identifiable PAC_ID.

If the PAC_ID is identifiable, the method determines that a recording and reproducing device having written the data on the disc has a version identical to a version of the present recording and reproducing device or there are no separate writing/reproduction restrictions, and the recording/reproduction is performed according to the instruction from the host 20.

If the PAC_ID is not identifiable, the method determines that the recording and reproducing device having written the data on the disc has a version different from the version of the present recording and reproducing device, and the recording/reproduction is preformed according to the instruction from the host with reference to recording/reproduction restriction areas on the disc including the "Unknown PAC rule". Accordingly, the microcomputer 16 provides the location information and data according to the instruction from the host to the servo 14 and the data-processor 13, so that the recording/reproduction is finished at a desired location on the optical disc through the pickup part 11.

As described above, the methods and apparatus for recording and reproducing in a high density optical write-once disc according to example embodiments of the present invention may have one or more of the following advantages.

First, the definition of an accessible area of a disc of a different version drive by using PACs may permit more robust protection of a data area having user data recorded thereon, for example, to prevent or reduce unauthorized access (for example, hacking).

Second, a plurality of valid PACs may be allocated on the disc and information indicating PAC status information may be recorded in a TDDS, thereby managing the PAC within the high density optical disc.

Third, apparatus and method for recording/reproducing data using PACs may permit more effective data recording/reproduction on a high density optical disc.

It will be apparent to those skilled in the art that various modifications and variations can be made to the example embodiments of the present invention described above without departing from the spirit or scope of the invention. Thus, it is intended that the present invention covers the modifications and variations of this invention provided they come within the scope of the appended claims and their equivalents.

What is claimed is:

1. A recording medium, comprising:
   at least one data area for storing at least one control data for managing an access to the recording medium and enlarging compatibility of the recording medium by controlling the access according to a predetermined rule in the control data if the control data is not identified by an apparatus attempting to record/reproduce data, the control data including an updated version of control data and a previously stored version of control data being recorded before recording the updated version; and
   at least one management area for storing status information for the control data, the status information including first information for indicating a validity of the updated version of control data and second information for indicating an invalidity of the previously stored version of control data.

2. The recording medium of claim 1, wherein the second information indicates that the previously stored version of control data is no longer valid due to updating of the control data.

3. The recording medium of claim 1, wherein the recording medium is a write once recording medium and the at least one management area is a temporary disk definition structure (TDDS).

4. The recording medium of claim 3, wherein the status information is updated in the TDDS.

5. The recording medium of claim 1, wherein the status information further includes information for indicating an available status of a next updated version of control data.

6. The recording medium of claim 5, wherein the first information is changed to indicate that the updated version of control data is invalid, if the next updated version has been recorded.

7. The recording medium of claim 1, wherein the control data is to be recorded in a recording unit.

8. The recording medium of claim 7, wherein the status information further includes defect status information and/or allocation status information.

9. The recording medium of claim 8, wherein the defect status information indicates whether each recording unit is defective.

10. The recording medium of claim 8, wherein the defect status information indicates whether each recording unit is non-defective.

11. The recording medium of claim 8, wherein the allocation status information indicates whether each recording unit is allocated.

12. The recording medium of claim 8, wherein the allocation status information indicates whether each recording unit is newly allocable.

13. The recording medium of claim 1, wherein the status information is represented by at least one bit.

14. The recording medium of claim 1, wherein the status information includes a status bit map.

15. The recording medium of claim 14, wherein the status bit map indicates at least validity of each recording unit.

16. The recording medium of claim 15, wherein the status bit map indicates whether each recording unit is unrecorded, usable or reusable, defective, or valid.

17. The recording medium of claim 1, wherein the control data is read by a recording/reproducing apparatus to access to the recording medium.

18. The recording medium of claim 1, further comprising:
a backup area storing a copy of the control data,
wherein the data area and the backup area are located in an inner area of the recording medium.

19. A method of updating control data stored on a recording medium, the method comprising the steps of:
recording an updated version of the control data for managing an access to the recording medium and for enlarging compatibility of the recording medium by controlling the access according to a predetermined rule in the control data if the control data is not identified by an apparatus attempting to record/reproduce data; and
recording status information, the status information including first information for indicating a validity of the updated version of control data and second information for indicating an invalidity of a previous version of control data.

20. The method of claim 19, wherein the second information indicates that the previously stored version of control data is no longer valid due to updating of the control data.

21. The method of claim 19, wherein the updated version of control data is not recorded in a defective area but in a next recordable area if there is the defective area in a data area.

22. The method of claim 19, wherein the control data is to be recorded in a recording unit.

23. The method of claim 19, further comprising: recording a copy of the control data in a backup area of the recording medium, wherein the backup area is located in an inner area of the recording medium.

24. A method of recording/reproducing data on/from a recording medium, the method comprising:
reading status information from the recording medium, the status information including first information for indicating a validity of an updated version of control data and second information for indicating an invalidity of a previous version of control data; and
reading the control data from the recording medium based on the status information, the control data managing an access to the recording medium and enlarging compatibility of the recording medium by controlling the access according to a predetermined rule in the control data if the control data is not identified by an apparatus attempting to record/reproduce data.

25. An apparatus for recording to and/or reproducing from a recording medium, comprising:
an optical unit configured to record data on the recording medium or reproduce data from the recording medium; and
a control unit operably connected with the optical unit and configured to control the optical unit to update control data and to record status information on the recording medium, the control data managing an access to the recording medium and enlarging compatibility of the recording medium by controlling the access according to a predetermined rule in the control data if the control data is not identified by the control unit, the status information including first information for indicating a validity of the updated control data and second information for indicating an invalidity of a previous control data.

26. The apparatus of claim 25, the apparatus further comprising a host device, the host device for giving command of writing and/or reading the data to the control unit.

27. The apparatus of claim 25, wherein the control unit is further configured to control the optical unit to record a copy of the control data in a backup area of the recording medium, wherein the backup area is located in an inner area of the recording medium.

28. An apparatus for recording/reproducing data in/from a recording medium, comprising:
an optical device configured to record/reproduce data in/from the recording medium; and
a controller operably connected with the optical device and configured to control the optical device to read status information from the recording medium, the status information including first information for indicating a validity of an updated version of control data and second information for indicating an invalidity of a previous version of control data, and the controller configured to control the optical device to read the control data from the recording medium based on the status information, the control data managing an access to the recording medium and enlarging a compatibility of the recording medium by controlling the access according to a predetermined rule in the control data if the control data is not identified by the controller.

29. The apparatus of claim 28, wherein the controller is further configured to control the optical device to record a copy of the control data in a backup area of the recording medium, wherein the backup area is located in an inner area of the recording medium.

* * * * *